United States Patent [19]

Lanzenberger

[11] 3,924,479
[45] Dec. 9, 1975

[54] BRAKE MECHANISM TO PREVENT REVERSE ROTATION OF A DRIVE SPINDLE

[75] Inventor: Horst Lanzenberger, Munich, Germany

[73] Assignee: Friedrich Deckel Aktiengesellschaft, Munich, Germany

[22] Filed: Mar. 4, 1974

[21] Appl. No.: 447,923

[30] Foreign Application Priority Data
Mar. 7, 1973  Germany............................ 2311307

[52] U.S. Cl. ................ 74/89.16; 188/134; 188/72.7
[51] Int. Cl.² ......................................... F16H 27/02
[58] Field of Search .................... 74/89.16; 192/8 R; 188/134, 72.7

[56] References Cited
UNITED STATES PATENTS

| | | | |
|---|---|---|---|
| 2,783,861 | 3/1957 | Jungles ............................... | 188/134 |
| 2,834,443 | 5/1958 | Olchawa .............................. | 192/8 R |
| 3,190,588 | 6/1965 | Pisano................................. | 192/8 R |
| 3,621,958 | 8/1970 | Klemm................................ | 188/134 |

*Primary Examiner*—Samuel Scott
*Assistant Examiner*—Wesley S. Ratliff, Jr.
*Attorney, Agent, or Firm*—Woodhams, Blanchard and Flynn

[57] ABSTRACT

Brake mechanism to prevent reverse rotation of a drive spindle. A drive wheel is mounted coaxial on, but rotatable with respect to, the spindle, is held against axial movement with respect thereto, and carries oppositely facing circumferentially directed cams. A device rotatable with the spindle carries co-operating cam surfaces whereby rotation of the drive wheel imposes a rotative force onto the spindle and a reactive axially directed force onto the drive wheel. A brake is provided between the drive wheel and the frame of the machine which brake is activated by relative axial movement of the wheel with respect to such frame. Thus, driving rotation of the wheel effects rotation of the spindle and also moves the wheel axially of both the spindle and the machine frame to urge the braking surfaces together. One embodiment shows conical braking surfaces and another embodiment shows a multiple-disk brake.

6 Claims, 3 Drawing Figures

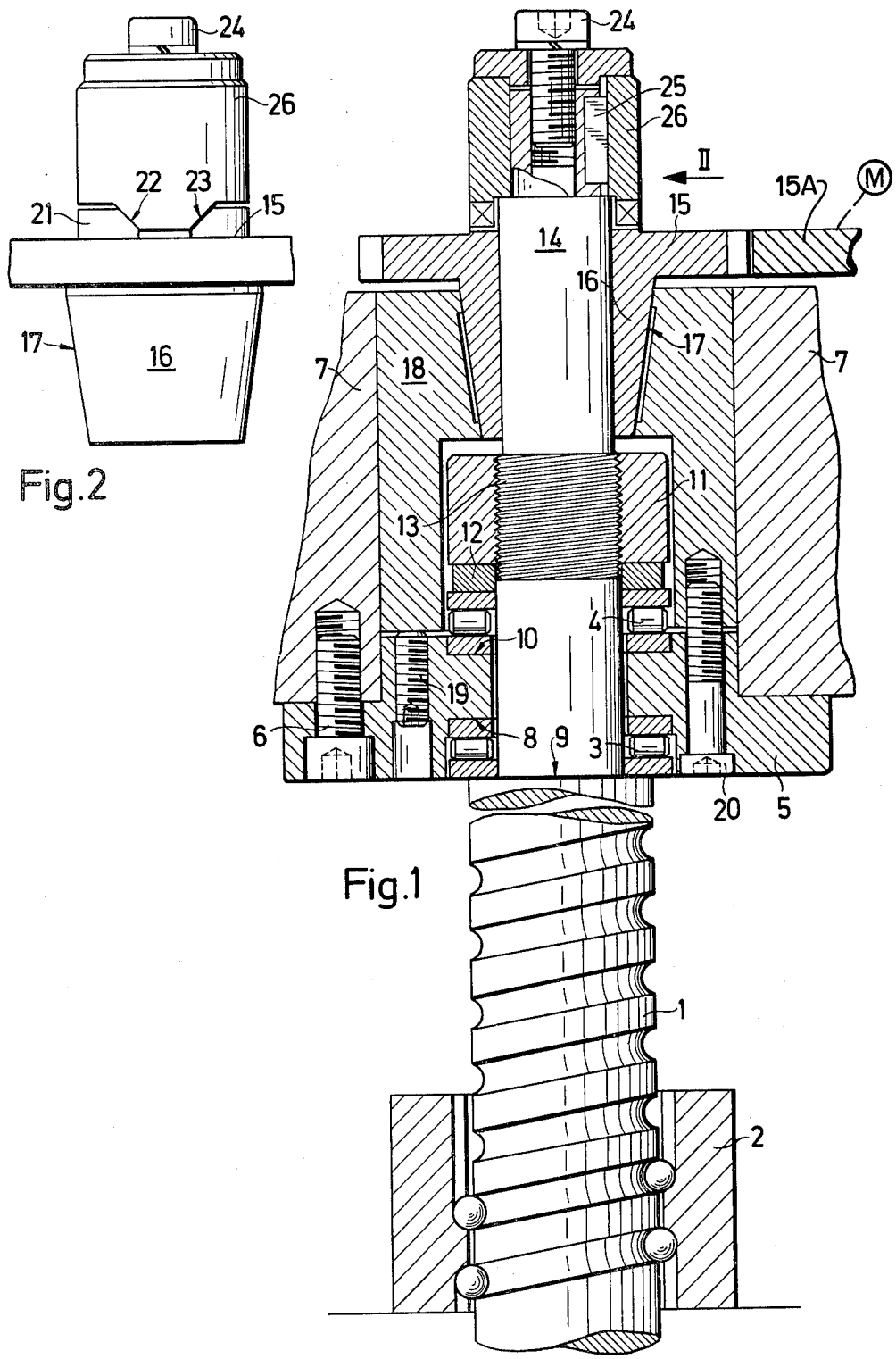

BRAKE MECHANISM TO PREVENT REVERSE ROTATION OF A DRIVE SPINDLE

FIELD OF THE INVENTION

The invention relates to a brake mechanism to prevent the reverse rotation of a drive spindle which is not self-locking, for example a ball-roll spindle.

BACKGROUND OF THE INVENTION

In my earlier U.S. Pat. No. 3,543,598, there was disclosed a mechanism in which an axially movable driving gear is arranged on the spindle shaft, said gear meshing through helical or bevel teeth with a further gear. The sloped surfaces of such teeth during the transfer of torque cause an axial force to be simultaneously applied onto the driving gear, which force is then used to load a friction brake. Said friction brake prevents the reverse rotation of the drive spindle which is connected fixedly with respect to rotation to the driving gear.

This previous construction assumes that the movable driving gear mates with a further gear because the sloped surfaces are arranged on these two gears - for example as bevel-gear teeth - for producing the load-responsive axial force. This arrangement further causes the axial force to become effective only in one torque direction. Therefore, such a mechanism is primarily used in the case of vertical spindles which are mainly stressed in only one direction by the weight of a worktable, the workpiece or the working forces.

Thus, the purpose of the invention is to produce a brake mechanism of the above-mentioned type which will be a simple and thus inexpensive structure provide braking means which is active in both torque directions.

SUMMARY OF THE INVENTION

Said purpose is attained according to the invention by causing the sloped surfaces of the driving gear to cooperate with sloped surfaces on the spindle shaft, through which respective surfaces the torque between the drive spindle and the driving gear is transmitted and the axial force is produced. The slope of the sloped surfaces is such that an axial force is produced in at least one torque direction.

The sloped surfaces are thus, contrary to the present construction, no longer arranged between the driving gear and a further gear cooperating therewith, but are instead arranged between driving gear and spindle shaft.

Thus the construction of the invention is now independent from whether a further gear cooperates with the driving gear or how the teeth are constructed and makes it possible to select the sloped surfaces more freely than previously for producing the axial braking force. In particular, the inventive solution permits also such a construction of the sloped surfaces as to create an equally acting axial force in both torque directions.

The driving gear is no longer connected through a wedge or the like fixed with respect to rotation to the drive spindle or the spindle shaft, but only through the sloped surface pairing which basically permits a clearance, even if only a small one, in the direction of rotation. How the driving gear itself is driven, namely whether it is constructed thus for example directly as a handwheel or is connected to further gear means, is of no importance for the operation of the brake.

According to a further characteristic of the invention, sloped surfaces are provided on the driving gear, which sloped surfaces rise in both torque directions, and which cooperate with corresponding sloped surfaces on the spindle shaft. In this manner, the driving gear is loaded in the same axial direction for both torque directions. Such a construction is particularly suitable for horizontal spindles which must absorb loads in both axial directions. A typical example of such is a drive spindle for a horizontally movable worktable onto which working forces act in both directions.

A design which is attractive for both manufacturing and installation simplicity is obtained, according to the invention, when the driving gear is supported freely rotatably and axially movably on the spindle shaft and engages through sloped surfaces provided on its front face cooperating surfaces which are provided on the front face of a sleeve or the like which latter is connected fixedly with respect to rotation with the spindle shaft.

Furthermore the driving gear can inventively be itself provided with, for example, a conical friction surface or can be urged in a conventional manner against a multiple-disk coupling device.

According to a further characteristic of the invention it is provided that the friction surface which is connected to the housing, and against which surface abuts the friction surface which is loaded by the driving gear, is adjustable in its axial direction so that the brake mechanism can always be adjusted substantially free of clearance.

BRIEF DESCRIPTION OF THE DRAWINGS

Several exemplary embodiments of the invention are illustrated in the drawings and are described more in detail hereinafter.

In the drawings:

FIG. 1 is a cross-sectional view of a brake mechanism in which the driving gear is provided with a conical brake surface;

FIG. 2 illustrates a detail of the brake mechanism according to FIG. 1 with inclined surfaces which act in both torque directions.

DETAILED DESCRIPTION

Figure 3:
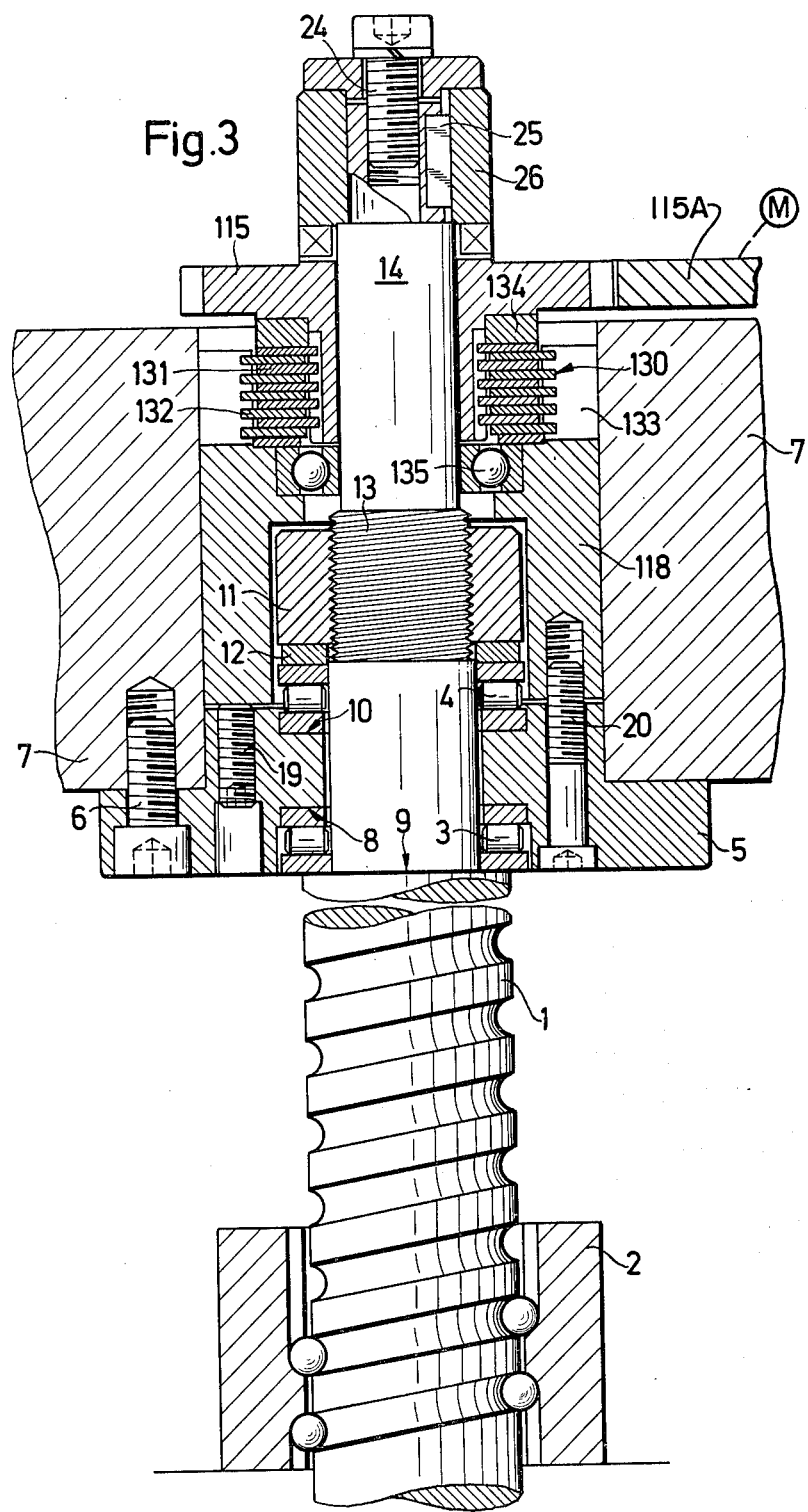
FIG. 3 is a brake mechanism having a multidisk brake which is loaded by the driving gear.

The ball-roll spindle 1 which is illustrated in FIG. 1 serves for example to drive a horizontally movable worktable. It is supported in axial direction on a spindle nut 2 which is fixedly connected to the machine or on a vertically adjustable knee, so that it moves axially during a rotary movement of the spindle. At the end remote from the spindle nut 2 a driving flange 5 is supported in an axially nonmovable manner through axial bearings 3 and 4, which driving flange in turn is fastened by multiple screws 6 to the frame 7 of the worktable. One axial bearing 3 is received in a circular recess 8 in one front face of the driving flange and rests against a shoulder 9 of the ball-roll spindle. A second axial bearing 4 lies partly in a recess 10 on the oppositely positioned front face of the driving flange. Both axial barings can be prestressed by a clamp nut 11 through a pressure ring 12. The clamp nut is screwed on a thread 13 of the spindle shaft 14 and is secured in any desired manner, here not illustrated in detail, against rotation.

A driving gear 15 is positioned axially movably on, and rotatable with respect to, the spindle shaft 14 through which driving gear a driving torque can be transmitted by means described hereinafter onto the ball-roll spindle 1. Said driving gear is constructed in the present example as a gear which is coupled through any desired gearing 15A to a drive motor M. It may, however, also be constructed for example directly as a handwheel. The driving gear 15 has a hub 16 with a conical outer surface which is constructed as a brake surface 17. This brake surface rests against a corresponding inner conical surface of a sleeve 18 which coaxially surrounds the hub 16. Said sleeve can be adjusted in its axial direction through a plurality of screws 19 which are supported on the driving flange 5 and can be fixed by means of screws 20 with respect to the driving flange so that any possible clearance between the sleeve 18 and the hub 16 can be balanced.

As can particularly be seen from FIG. 2, the driving gear is provided on its front face remote from the hub 16 with a shoulder 21 which has inclined surfaces 22 or 23 which are sloped in circumferential direction. Corresponding sloped surfaces of a sleeve 26, which is fixedly connected to the spindle shaft 14 through a screw 24 and a key 25, cooperate with said sloped surfaces.

The mechanism operates as follows: To drive the ball-roll spindle a torque is introduced in any desired manner onto the driving gear 15, which torque is transmitted through the sloped surfaces 22, 23 onto the sleeve 26 and thence to the ball-roll spindle. Since the spindle is axially restrained with respect to the frame 7 and sleeve 18, an axial force which acts onto the driving gear is thereby simultaneously produced, which force urges the brake surface 17 of the hub 16 against the inner conical surface of the sleeve 18. The braking force which is thus created must be overcome in addition to the load which must be moved by the ball-roll spindle. Thus, the drive of the ball-roll spindle must be designed according to the greatest load which in turn must be calculated with the foregoing requirements in mind.

Since the ball-roll spindle is not self-locking, it is caused to rotate by an axial load which is produced through the frame 7 or the driving flange 5. Depending on the direction of rotation, one of the sloped surfaces of the sleeve 26 presses thereby onto the corresponding sloped surface 22 or 23 of the driving gear 15 and causes in this manner an engagement of the brake surface 17 on the inner conical surface of the sleeve 18. The slope of the sloped surfaces can be so chosen as to provide a self-reinforcing effect on the brake whereby a small initial rotational locking of the driving gear, which locking is caused for example by the mass moment of the inertia of the driving gear, is sufficient to let the brake react.

FIG. 3 illustrates an embodiment which acts in principle the same as the example according to FIGS. 1 and 2 but in which the cone brake is replaced by a multiple-disk brake. The same parts are identified by the same reference numerals. The driving gear 115 driven from a drive motor M and gear 115A, itself has in this embodiment no brake surface but presses only in an axial direction onto a multiple-disk brake which as a whole is identified with reference numeral 130. Said brake consists in a conventional manner of several circular disks 131 or 132, which are alternately mounted on the hub 116 of the driving gear or are inserted axially movably, however, nonrotatably, into the annular member 133 surrounding said hub. When the driving gear 115 is axially urged, it presses through the pressure ring 134 onto the stack of disks 131, 132, which on the other side is supported against the sleeve 118. The radial bearing 135 serves to center the spindle shaft 14 in the sleeve 118.

In the illustrated examples the axial force component is produced by a sloped surface pairing which is arranged between spindle shaft and driving gear. Therefore, the teeth of the driving gear should be such that they do not produce an axial force and in no case should they produce a component which neutralizes the axial force effected by the sloped surfaces. Therefore the driving gear 15 or 115 is advantageously provided with straight teeth aligned parallel to the axis of such gear.

Although particular preferred embodiments of the invention have been disclosed above for illustrative purposes, it will be understood that variations or modifications thereof which lie within the scope of the appended claims are fully contemplated.

I claim:

1. A brake mechanism for preventing the reverse rotation of a nonself-locking axially movable and rotatable drive spindle upon which a load is applied, comprising:

support means having said drive spindle rotatably mounted therein and a first friction surface thereon;

a drive gear having teeth thereon mounted on said drive spindle, said drive gear being axially movable with respect to said drive spindle and having second friction surface means thereon movable into and out of engagement with said first friction surface;

drive means positively drivingly coupled to said teeth on said drive gear for driving said drive spindle;

a first cam surface secured to said drive spindle and being rotatable therewith; and a second cam surface mounted on said drive gear and positioned to engage said first cam surface in response to a relative rotation occurring between said drive gear and said drive spindle, said engagement between said first and second cam surfaces effecting an axial movement of said second friction surface on said drive gear into engagement with said first friction surface on said support means during said relative rotation to effect a braking of said drive gear and said drive spindle.

2. The brake mechanism according to claim 1, wherein said first and second cam surfaces each comprise a set of sloped surfaces, one set being mounted on said driving gear and being inclined in both circumferential directions and cooperate with corresponding sloped surfaces on the other set mounted on said drive spindle.

3. The brake mechanism according to claim 1, wherein said driving gear has a shoulder on which is provided at least one inclined second cam surface and which is inclined in a circumferential direction; and wherein said first cam surface is provided on a sleeve secured to said drive spindle, said first cam surface abutting said second cam surface.

4. The brake mechanism according to claim 1, wherein said first and second friction surface means are conically shaped.

5. The brake mechanism according to claim 1, wherein said first and second friction surfaces comprises a multiple-disk clutch.

6. The brake mechanism according to claim 1, wherein said first cam surface includes means for adjusting said first cam surface axially of said drive spindle.

* * * * *